United States Patent [19]

Sauer et al.

[11] Patent Number: 5,098,677
[45] Date of Patent: Mar. 24, 1992

[54] ACTINIDE METAL PROCESSING

[75] Inventors: Nancy N. Sauer; John G. Watkin, both of Los Alamos, N. Mex.

[73] Assignee: The United States of America as represented by the Department of Energy, Washington, D.C.

[21] Appl. No.: 680,972

[22] Filed: Apr. 5, 1991

[51] Int. Cl.$^5$ .............................................. C01G 57/00
[52] U.S. Cl. .......................................... 423/11; 423/3; 252/187.24; 252/187.25; 252/198.26
[58] Field of Search ..................... 423/3, 11, 16, 260, 423/261, 252, 250; 252/638, 643, 187.24, 187.25, 187.26

[56] References Cited

U.S. PATENT DOCUMENTS

| | | | |
|---|---|---|---|
| 3,726,956 | 4/1973 | Silver | 423/4 |
| 4,098,866 | 7/1978 | Carnahan et al. | 423/7 |
| 4,105,253 | 8/1978 | Showalter | 299/4 |
| 4,185,872 | 1/1980 | Habib, Jr. | 299/4 |
| 4,312,840 | 1/1982 | Habib, Jr. et al. | 423/17 |
| 4,402,921 | 9/1983 | Stapp | 423/17 |
| 4,687,601 | 8/1987 | Bachelard et al. | 252/638 |
| 4,698,214 | 10/1987 | Linz et al. | 423/260 |
| 4,808,390 | 2/1989 | Tanaka et al. | 423/261 |
| 4,882,100 | 11/1989 | Yato et al. | 264/5 |
| 4,963,294 | 10/1990 | Yato et al. | 252/636 |

OTHER PUBLICATIONS

Katz, J. J., et al, The Chemistry of Uranium, Chapt. 6, pp. 164–173.
Katz, J. J., et al, The Chemistry of The Actinide Elements, pp. 111–113.

Primary Examiner—Brooks H. Hunt
Assistant Examiner—Ngoclan T. Mai
Attorney, Agent, or Firm—Bruce H. Cottrell; Paul D. Gaetjens; William R. Moser

[57] ABSTRACT

A process of converting an actinide metal such as thorium, uranium, or plutonium to an actinide oxide material by admixing the actinide metal in an aqueous medium with a hypochlorite as an oxidizing agent for sufficient time to form the actinide oxide material and recovering the actinide oxide material is provided together with a low temperature process of preparing an actinide oxide nitrate such as uranyl nitrte. Additionally, a composition of matter comprising the reaction product of uranium metal and sodium hypochlorite is provided, the reaction product being an essentially insoluble uranium oxide material suitable for disposal or long term storage.

12 Claims, No Drawings

ACTINIDE METAL PROCESSING

FIELD OF THE INVENTION

The present invention relates to the field of actinide metal processing. This invention is the result of a contract with the Department of Energy (Contract No. W-7405-ENG-36).

BACKGROUND OF THE INVENTION

Chips and turnings of actinide metals, such as uranium metal, are generated during the machining of such materials. The chips and turnings are generally stored under oil as they can react vigorously upon contact with either air or water. Scraps of these metals represent both a radiological and hazardous waste problem.

One general process of disposal involves the use of concentrated aqueous oxidizing acids to initially dissolve such an active metal. The dissolution is an exothermic, redox-type reaction and releases large amounts of hydrogen gas as a by-product of the metal oxidation. Governmental sites will not generally use such a dissolution process, because of the danger from the flammable hydrogen gas. Instead, the actinide metal, e.g., uranium, is burned to form the metal oxide prior to subsequent processing. The burning avoids any redox reaction in subsequent dissolution of the metal oxide. After dissolution, the metal oxide is purified from any contaminants by conventional techniques such as ion exchange or solvent extraction. Unfortunately, this process suffers several disadvantages, e.g., high operator exposure, an excessive number of operations, and poor overall process efficiency.

Previously, oxidants such as hypochlorites have been used as an oxidizing additive in the dissolution of uranium ores, e.g., in the in-situ leaching of uranium ores from subterranean ore deposits. For example, U.S. Pat. No. 4,312,840 describes the use of an alkali metal or alkaline earth metal hypochlorite to oxidize the uranium in a subterranean deposit from a tetravalent state ($U^{+4}$) to a hexavalent state ($U^{+6}$) in an overall process using an aqueous lixiviant having a pH within the range of 7.5 to 10.0. In a similar manner, U.S. Pat. No. 4,185,872 describes the use of hypochlorite to oxidize the uranium from a tetravalent state ($U^{+4}$) to a hexavalent state ($U^{+6}$) in an overall process using an aqueous lixiviant having a pH of at least 7.5 and containing an alkali metal sulfate leaching agent.

Surprisingly, it has now been found that reaction of a hypochlorite such as sodium hypochlorite with an actinide metal yields an insoluble actinide oxide material thereby forming an essentially inert uranium-containing material that may be isolated for storage, disposal or recycle.

Accordingly, it is an object of this invention to provide a process of converting an actinide metal such as, e.g., thorium, uranium, or plutonium, into an insoluble actinide oxide material, without the need for initial burning and subsequent dissolution.

It is a further object of this invention to provide a process of converting an actinide metal such as, e.g., thorium, uranium, or plutonium, to an insoluble actinide oxide material, at low temperatures, i.e., preferably such conversion occurring at or near room temperature.

It is yet another object of this invention to provide a convenient low temperature synthesis of an actinide oxide material from an actinide metal such as thorium, uranium, or plutonium.

It is still another object of this invention to provide a convenient low temperature synthesis of an actinide oxide nitrate material, e.g., uranyl nitrate ($UO_2(NO_3)_2$), from an actinide metal such as thorium, uranium, or plutonium.

SUMMARY OF THE INVENTION

To achieve the foregoing and other objects, and in accordance with the purposes of the present invention, as embodied and broadly described herein, the present invention provides a process of converting an actinide metal to an insoluble actinide oxide material including admixing an actinide metal in an aqueous medium with a hypochlorite as an oxidizing agent for sufficient time to form an insoluble actinide oxide material, and separating the insoluble actinide oxide material. In one embodiment of the present invention, the actinide metal is admixed with an aqueous solution of sodium hypochlorite for sufficient time to form the insoluble actinide oxide material, and the insoluble actinide oxide material separated or recovered.

The present invention further provides a process of preparing an actinide oxide nitrate material, e.g., uranyl nitrate, by admixing an actinide metal with an aqueous solution of a hypochlorite as an oxidizing agent for sufficient time to form an insoluble actinide oxide material, and reacting the insoluble actinide oxide material with nitric acid, e.g., a dilute nitric acid solution, to form the actinide oxide nitrate.

The present invention still further provides a composition of matter comprising the reaction product of uranium metal and sodium hypochlorite, said composition further characterized as insoluble.

DETAILED DESCRIPTION

The present invention concerns a simple low temperature process of converting an actinide metal to an actinide oxide. Such a conversion is often desired to avoid the storage of bulk uranium metal that can be susceptible to adverse reactions with, e.g., water. The process will be generally applicable to any of the actinide metals such as thorium, uranium, plutonium, neptunium, americium and the like. However, only the actinide metals thorium, uranium, and plutonium are generally present in bulk quantities that present a problem.

The present invention provides a process for converting an actinide metal to an insoluble actinide oxide material by admixing an actinide metal in an aqueous medium with a hypochlorite as an oxidizing agent for sufficient time to form the insoluble actinide oxide material, and separating or recovering the insoluble actinide oxide material from the admixture. Generally, the actinide metal is dispersed within an aqueous hypochlorite solution containing an excess stoichiometric amount of the hypochlorite as based upon the amount of actinide metal present. Optionally, a substoichiometric amount of hypochlorite can be initially added and additional hypochlorite solution can be gradually added. Completion of the reaction can be determined by analytical assay for the actinide metal. The admixture is maintained in contact for time sufficient to form the actinide oxide material, generally for periods of from about 15 minutes to about 4 hours, preferably from about 1 hours to about 2 hours. The resultant insoluble actinide oxide material can be isolated by filtration.

While not wishing to be bound by the present explanation, it is believed that in the present process, the hypochlorite oxidizes the actinide metal, e.g., uranium metal, from a zero valence state ($U^o$) to a hexavalent state ($U^{+6}$) and that the resultant uranium oxide material is a polymeric uranium oxide material. This would account for the total insolubility in water and other typical solvents. Similarly, thorium metal may be converted into an insoluble thorium oxide material ($Th^{+4}$) and plutonium metal may be converted into an insoluble plutonium oxide material. It is further believed that by the optional use of a substoichiometric amount of hypochlorite, uranium metal may be oxidized at least in part only to a tetravalent state ($U^{+4}$) and that the resultant uranium oxide material would then be uranium dioxide.

The initial actinide metal is generally present in the form of small scrap, e.g., small chips and turnings, remaining from machining of the metal. The process may be practiced with larger pieces of actinide metal, although the use with larger bulk pieces may require longer reaction periods, i.e., greater than about 4 hours, for completion of the conversion to an insoluble actinide oxide material.

By "actinide metal", it is meant to include: (a) clean actinide metal, i.e., actinide metal free of any surface coating such as an oxide or nitride surface coating; (b) dirty actinide metal, i.e., actinide metal having a surface coating such as an oxide or nitride surface coating; and, (c) actinide alloys, e.g., uranium alloys such as uranium-niobium and the like generally containing from about 1 to about 10 weight percent of a non-actinide alloying metal. Clean actinide metal can generally be obtained by treating dirty actinide metal with concentrated nitric acid. However, such a pretreatment or cleaning of the actinide metal is not generally necessary in the present process.

The resultant product of the reaction between the actinide metal, e.g., uranium, and the hypochlorite is an essentially insoluble, highly stable material containing the actinide metal in a form well suited for containment, storage or disposal. The reaction product is insoluble in water, alcohols such as ethanol and isopropanol, and solvents such as acetonitrile and dichloromethane.

The hypochlorite used in the present process can be any alkali metal hypochlorite such as sodium hypochlorite or potassium hypochlorite, preferably sodium hypochlorite, or any alkaline earth metal hypochlorite, preferably calcium hypochlorite. Preferably, the hypochlorite is sodium hypochlorite. A simply readily available form of sodium hypochlorite can be a standard bleach solution, generally containing about 5 percent by weight sodium hypochlorite and available from Chlorox Corp.

When sodium hypochlorite is used as the oxidizing agent, the sodium hypochlorite is most conveniently added as an aqueous solution to the actinide metal. Generally, such solutions can be of any commercially available concentration, e.g., from about 1 to about 20 weight percent NaOCl.

The present process can be conducted at low temperatures, generally from about 10° C. to about 50° C., preferably from about 20° C. to about 40° C. Higher temperatures may also be employed. Generally, when the actinide metal, e.g., uranium, is clean, i.e., there is no surface coating such as an oxide or nitride surface coating, the reaction with the hypochlorite can generate some heat in an exothermic process. In such a situation, the admixture can be cooled by any appropriate means such as an ice bath or cooling jacket, if so desired.

Insoluble uranium oxide material prepared by the process of the present invention can serve as a precursor for the formation of uranyl nitrate in a low temperature process. After the insoluble uranium oxide material is formed by the reaction of the uranium metal and the hypochlorite, the resultant product can be reacted with nitric acid, generally a dilute nitric acid solution of from about 0.01 Molar (M) to about 5M, preferably from about 0.1M to about 1M. The resultant uranyl nitrate can then be separated from the admixture. Other actinide oxide nitrates may be prepared in the same manner.

The present invention is more particularly described in the following examples which are intended as illustrative only, since numerous modifications and variations will be apparent to those skilled in the art.

EXAMPLE 1

A sample of uncleaned uranium turnings (14.45 grams (g)) was placed in a 250 milliliter (ml) flask and 175 ml of aqueous sodium hypochlorite (5 percent by weight sodium hypochlorite) was added to cover the turnings. After a few minutes, a grey/green precipitate was observed to form and the solution was stirred for about 24 hours. Dilute nitric acid (about 0.1 Molar) was added to redissolve the grey/green precipitate, leaving a dark grey metallic precipitate in a pale greenish solution. The solution was filtered through a medium porosity frit to separate the dark grey metallic solids. The water was evaporated from the remaining pale greenish solution to leave a bright yellow microcrystalline solid in a yield of 37 g.

EXAMPLE 2

Uranium turnings were cleaned with concentrated nitric acid and then rinsed with water and acetone. The clean uranium turnings (12.45 g) were placed in a 500 ml flask and 150 ml of a commercial bleach solution, available from Chlorox Corp. (5 percent by weight sodium hypochlorite) was added. Within a minute there was evidence of reaction and a bright yellow powder was formed. Over a period of about 30 minutes the reaction rapidly continued and significant heat was evolved (the temperature of the reaction mixture rose from about 20° C. to about 40° C.) as additional yellow powder was formed. After about two hours, essentially all of the uranium turnings had dissolved. Some black material, possibly uranium dioxide, was observed at the bottom of the flask. An additional 100 ml of the bleach solution was added and the reaction mixture stirred at room temperature for about 48 hours. After this time, all of the black material was consumed and only yellow powder was seen. The yellow product was separated on a medium porosity frit, leaving a colorless filtrate. The precipitate was dried under vacuum to yield 19.08 g. The solid material was found to be insoluble in all typical solvents such as lower alcohols, acetonitrile and dichloroethane thereby preventing recrystallization of the material. An IR of the resultant product showed bands at 3500 cm$^{-1}$ and 1630 cm$^{-1}$ (indicating water), and a strong band at 918 cm$^{-1}$ (indicating U=O stretching).

Although the present invention has been described with reference to specific details, it is not intended that such details should be regarded as limitations upon the scope of the invention, except as and to the extent that they are included in the accompanying claims.

What is claimed is:

1. A process of converting an actinide metal to an actinide oxide comprising:
   admixing an actinide metal with a hypochlorite as an oxidizing agent within an aqueous medium for sufficient time to form an insoluble actinide oxide material; and,
   separating the insoluble actinide oxide material.

2. The process of claim 1 wherein said hypochlorite is an aqueous solution of sodium hypochlorite.

3. The process of claim 1 wherein said actinide metal is uranium.

4. The process of claim 2 wherein said actinide metal is uranium.

5. The process of claim 2 wherein said aqueous solution of sodium hypochlorite contains greater than a stoichiometric amount of sodium hypochlorite based on actinide metal.

6. The process of claim 1 wherein the actinide metal is selected from the group consisting of thorium, uranium and plutonium.

7. The process of claim 1 wherein said admixture is conducted at temperatures of from about 10° C. to about 50° C.

8. A process of converting an actinide metal to an actinide oxide consisting essentially of:
   admixing an actinide metal selected from the group consisting of thorium, uranium and plutonium with an aqueous sodium hypochlorite solution as an oxidizing agent for sufficient time to form an insoluble actinide oxide material; and
   recovering the insoluble actinide oxide material.

9. The process of claim 8 wherein said aqueous solution of sodium hypochlorite contains greater than a stoichiometric amount of sodium hypochlorite based on actinide metal.

10. The process of claim 9 wherein said actinide metal is uranium.

11. A process of preparing uranyl nitrate comprising:
    admixing uranium metal with an aqueous sodium hypochlorite solution as an oxidizing agent for sufficient time to form an insoluble uranium oxide material;
    reacting the insoluble uranium oxide material with nitric acid to form uranyl nitrate; and,
    separating the uranyl nitrate from the admixture.

12. The process of claim 11 wherein said nitric acid is a dilute nitric acid solution of from about 0.01 Molar to about 1 Molar.

* * * * *